E. G. BADER.
THEFT ALARM FOR AUTOMOBILES.
APPLICATION FILED APR. 3, 1919.
1,307,802.
Patented June 24, 1919.
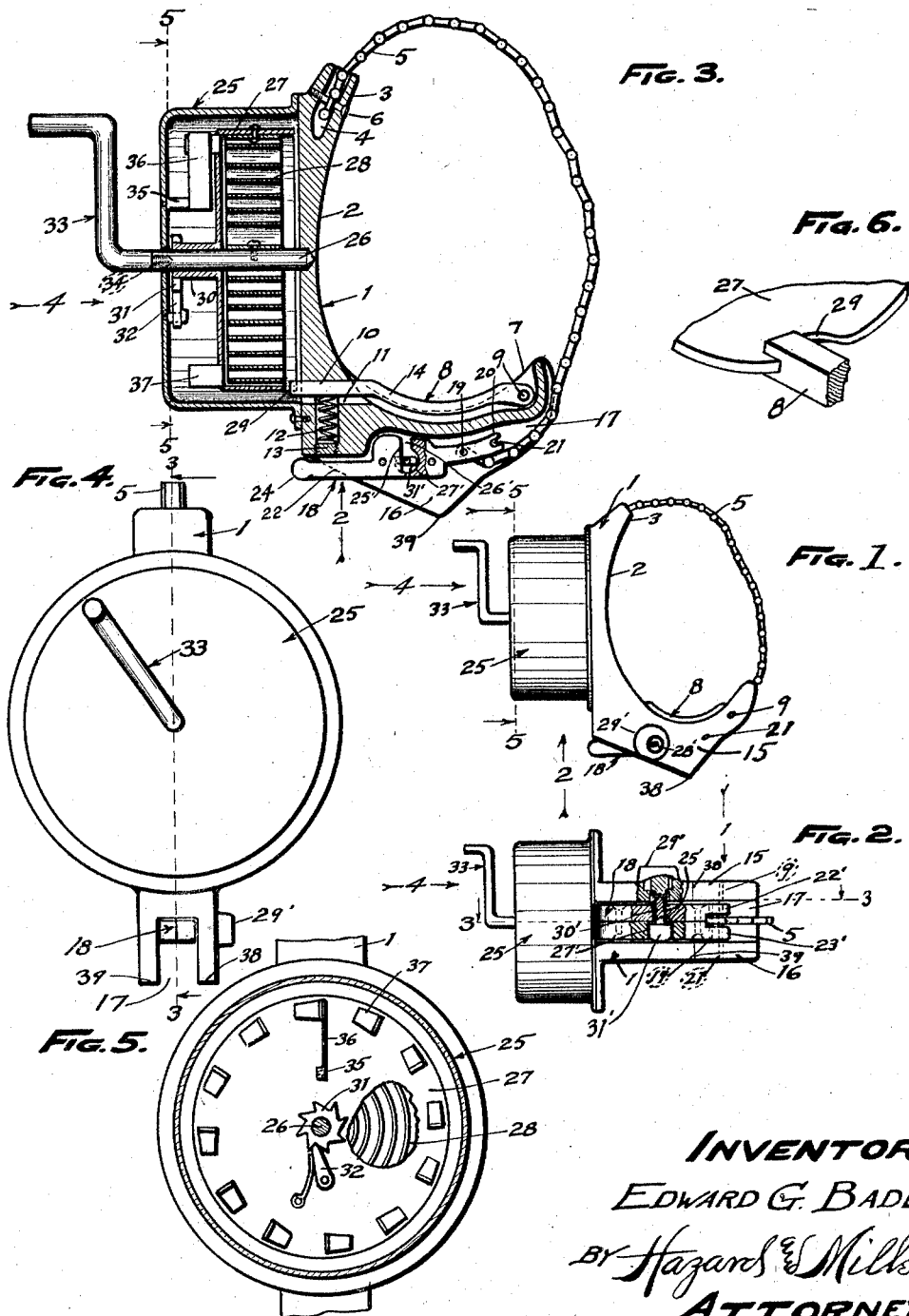
INVENTOR
EDWARD G. BADER.
BY Hazard & Miller
ATTORNEYS.

UNITED STATES PATENT OFFICE.

EDWARD G. BADER, OF LOS ANGELES, CALIFORNIA.

THEFT-ALARM FOR AUTOMOBILES.

1,307,802.  Specification of Letters Patent. Patented June 24, 1919.

Application filed April 3, 1919. Serial No. 287,189.

*To all whom it may concern:*

Be it known that I, EDWARD G. BADER, a citizen of the United States, residing at Los Angeles, in the county of Los Angeles and State of California, have invented new and useful Improvements in Theft-Alarms for Automobiles, of which the following is a specification.

My object is to make a theft alarm for automobiles and the like, and my invention consists of the novel features herein shown, described and claimed.

Figure 1 is a side elevation of a theft alarm embodying the principles of my invention.

Fig. 2 is a bottom plan looking in the direction indicated by the arrows 2 in Figs. 1 and 3.

Fig. 3 is an enlarged sectional detail on the lines 3—3 of Figs. 2 and 4.

Fig. 4 is a side elevation at right angles to Fig. 1 as seen looking in the direction indicated by the arrows 4 in Figs. 1, 2 and 3.

Fig. 5 is a sectional detail on a parallel with Fig. 4 and on the lines 5—5 of Figs. 1 and 3.

Fig. 6 is an enlarged fragmentary detail perspective showing the means of latching the clock spring casing.

The main frame 1 is a casting and has a curved inner face 2 adapted to fit against the outer side of a tire rim and tire and against the periphery of the tire. A shank 3 extends from the upper end of the body of the casting and has an opening 4 leading from its upper end, a sprocket chain 5 is inserted into the opening endwise and a screw 6 is inserted through the shank and through the end link of the chain from the inside, so that the screw cannot be removed when the theft alarm is in place upon a wheel. A recess 7 extends downwardly from the inner face 1 at the part which engages the tread of the frame 1, a lever 8 is mounted in the recess 7 and held in place by a pin 9 inserted through the casting and through the head of the lever 8. The swinging end 10 of the lever 8 extends through a slot 11 at the opposite end of the recess 7 from the pin 9, a spring 12 is inserted upwardly through a bore in the casting against the swinging end 10, and a plug 13 is inserted into the bore against the spring, the tension of the spring being exerted to hold the lever 10 elevated, and the curved inner face 14 of the lever 8 being in a plane to engage the tread of the tire, so that when the theft alarm is placed upon a tire and secured in place and the wheel rotated the tread of the tire will engage the lever and overcome the tension of the spring 12 and swing the end 10 outwardly from the wheel.

Housing plates 15 and 16 extend outwardly from the body of the casting to form a slot 17. The chain 5 is adapted to pass around the wheel rim inside of the felly and along the opposite side of the felly and tire to the inner lower end of the main frame 1, a hand lever 18 is connected to the end of the chain in the slot 17 by a pivot pin 19, the short end of the lever is bifurcated to form a fork 20, a pin 21 is inserted through the housing plates 15 and 16, and when the theft alarm is being applied to the wheel the fork 20 engages the pin 21 and the lever is drawn into the slot 17 to tighten the chain. The pivot pin 19 is a short distance from the fork 20 and toward the end of the handle 24.

The hand lever 18 is made in two pieces 22 and 23. A slot 25' extends from the inner edge of the piece 22, and a similar slot 26' extends from the inner edge of the piece 23 to a circular enlargement 27'. The tumbler lock 28' is mounted in a boss 29' extending from the outer face of the housing plate 15, and the locking bolt 30' extends from the rotating cylinder of the lock across the slot 17, there being a button 31' upon the end of the locking bolt 30', so that when the key is turned in the lock to the unlocking position the button 31' stands straight up and down, that is in a plane parallel with the slots 25' and 26'. Then when the handle 24 is operated to tighten the chain and swing the hand lever 18 into the slot 17 the locking bolt 30' and button 31' will pass into the slots 25' and 26', and when the key is turned to the locking position and removed the button 31' will be turned to a horizontal position, that is crosswise of the slot 25' and the hand lever is locked, the button 31' being longer than the slot 26' and when applied to a wheel the main frame is securely locked upon the wheel. The handle 24 of the hand lever 18 extends out of the slot 17 and across the face of the plug 13, so that when the theft alarm is locked the plug 13 cannot be removed.

A casing 25 is secured to the outer face of the main frame 1, a stem 26 is mounted through the casing at its center and extends into a bearing in the main frame 1, a clock spring casing 27 is rotatably mounted upon the stem 26 within the casing 25, a clock spring 28 is mounted in the casing 27, the inner end of the clock spring being connected to the stem 26 and the outer end of the clock spring being connected to the casing 27, a notch 29 is formed in the casing 27 in position to receive the extreme end of the lever 8, so that when the load of the wheel is not resting upon the lever 8 the tension of the spring 12 will force the lever 8 into the notch 29 and hold the casing 27 from rotating. A hub 30 extends from the casing 27 around the stem 26, a pawl wheel 31 is fixed to the hub, and a pawl 32 is connected to the casing 25 to engage the pawl wheel 31 to hold the spring 28 from unwinding. A crank or key 33 is connected to the stem 26 by screw threads 34 so that it may be applied to wind the spring and then removed if desired. A stud 35 extends inwardly from the face of the casing 25, a spring clapper 36 is secured to the stud 35 and extends radially outwardly, and angle plates 37 are secured to the face of the spring casing 27 and arranged radially and evenly spaced apart in position to engage the free outer end of the clapper 36.

When an automobile is to be left unprotected the theft alarm is applied to the wheel, the lock 23 applied and the crank or key 33 operated to wind the spring and the lever 8 will hold the spring wound, and if the automobile is started by an unauthorized person the points 38 and 39 of the housing plates 15 and 16 will strike the ground and dig into the ground and make a bump, and the weight of the load will press the tread against the lever 8 to press the end of the lever out of the notch 29 and release the spring, the spring will unwind rapidly carrying the casing 27 and the angle plates 35 will snap past the clapper 36 and make a racket.

Various changes may be made without departing from the spirit of my invention as claimed.

I claim:

1. A theft alarm for automobiles comprising a body adapted to fit against the side and periphery of a wheel rim and having a slot circumferentially in the periphery, a chain connected to the inner end of the body and adapted to pass around inside of the felly and extend into the slot, a lever connected to the chain and fitting in the slot, alarm mechanism mounted upon the body, and means for locking the lever in place.

2. A theft alarm for automobiles comprising a body adapted to fit against the side of a wheel rim and tire, a chain connected to the body and adapted to pass around inside of the felly and along the opposite side of the tire, means for locking the chain to the body, spring actuated alarm mechanism mounted upon the body and adapted to be held inactive, and means for releasing the alarm mechanism by the rotation of the wheel.

3. A theft alarm for automobiles comprising a body adapted to be clamped around a felly and tire and locked, and spring actuated alarm mechanism carried by the body and normally held inactive, and means for releasing the spring actuated alarm mechanism by the rotation of the wheel.

In testimony whereof I have signed my name to this specification.

EDWARD G. BADER.

Copies of this patent may be obtained for five cents each, by addressing the "Commissioner of Patents, Washington, D. C."